United States Patent [19]

Quant

[11] 4,291,360
[45] Sep. 22, 1981

[54] REMOTE CONTROL WIRING SYSTEM

[75] Inventor: Tony Quant, Toronto, Canada

[73] Assignee: Canadian General Electric Company Limited, Toronto, Canada

[21] Appl. No.: 106,840

[22] Filed: Dec. 26, 1979

[30] Foreign Application Priority Data

Feb. 23, 1979 [CA] Canada .................................... 322184

[51] Int. Cl.³ .......................................... H01H 47/32
[52] U.S. Cl. .................... 361/189; 361/205; 361/168
[58] Field of Search ............... 361/189, 190, 191, 205, 361/201, 210, 168

[56] References Cited

U.S. PATENT DOCUMENTS

| | | | |
|---|---|---|---|
| 4,068,295 | 1/1978 | Ferrigno, Jr. | 361/190 |
| 4,149,213 | 4/1979 | Flemons | 361/191 |

FOREIGN PATENT DOCUMENTS 689194  6/1964  Canada .............................. 306/298

Primary Examiner—J. D. Miller
Assistant Examiner—L. C. Schroeder
Attorney, Agent, or Firm—Raymond A. Eckersley

[57] ABSTRACT

A remote control wiring system is provided with a transformer that supplies a low voltage signal to a low voltage sub-system. The sub-system includes a diode circuit comprising four diodes which permit energization of a first set of relays on a positive portion of a sinusoidal signal and of a second set of relays on the negative portion of the signal. A pair of triacs are provided that move the relays of both sets either in a first direction to open their higher voltage load circuits or in a second direction to close their load circuits. Previous wiring systems did not include the 4-diode circuit and were limited in capacity to control only a single gang of relays. By virtue of the improved system the capacity of the system is reliably doubled, by utilizing the whole of the low voltage control signal.

8 Claims, 1 Drawing Figure

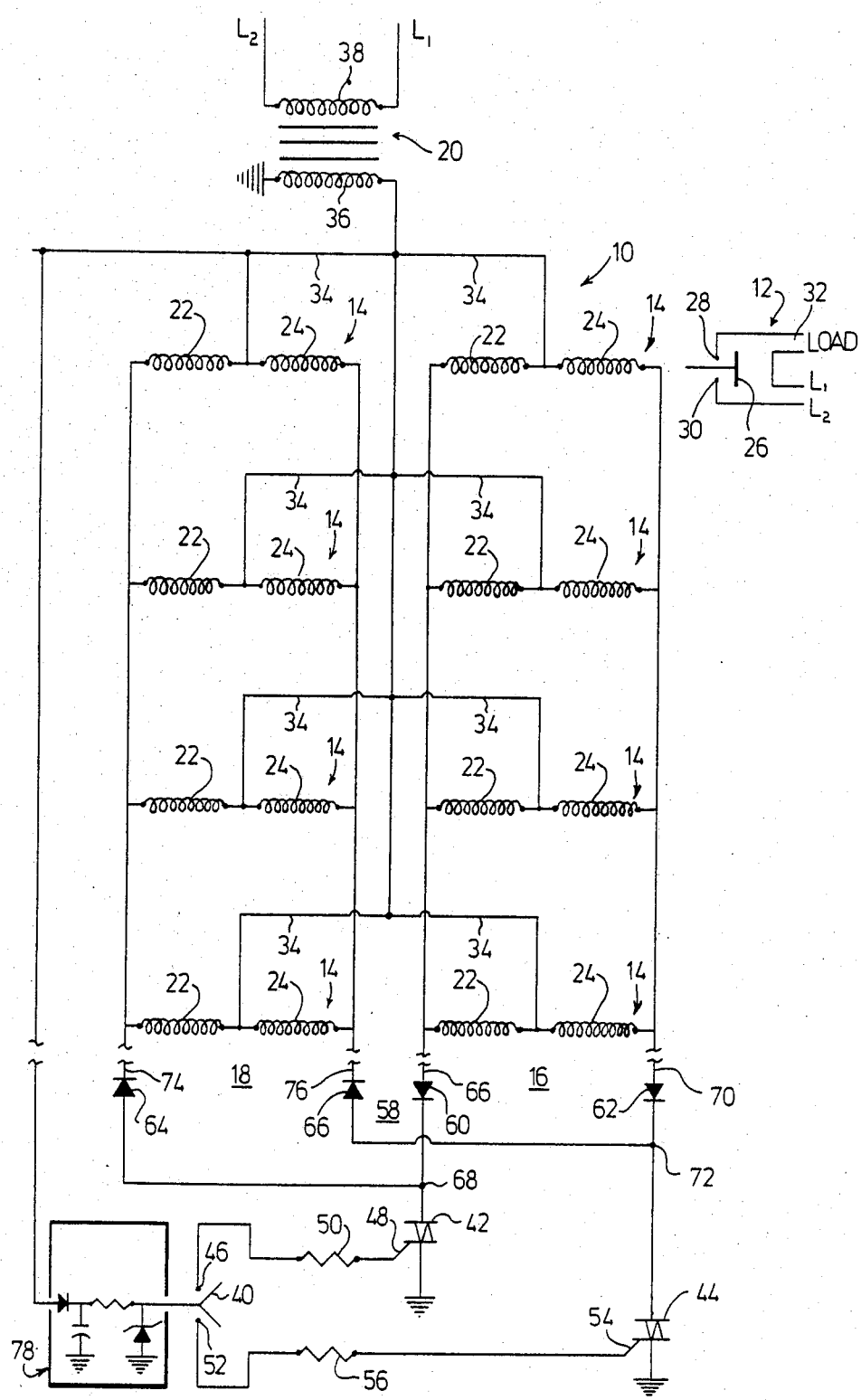

REMOTE CONTROL WIRING SYSTEM

This invention relates to remote control wiring systems in which high voltage load circuits are controlled by relays that are disposed in a low voltage sub-system and are controlled by switches in the sub-system.

Remote control wiring systems are often designed to simultaneously control a plurality of separate load circuits from a single switch. Wiring systems of this design are commonly utilized in commercial buildings to control all the lights on an entire floor from a single switch which, if desired, may be located on another floor. One remote control wiring system suitable for this purpose is disclosed in U.S. Pat. No. 4,068,296 issued Jan. 10, 1978 to W. L. Ferrigno. In this patent the wiring system includes a low voltage control sub-system having a transformer that supplies a low voltage signal to a set of relays. Each relay has two solenoid coils which then energized are each capable of moving the relay's solenoid plunger in a predetermined direction either, in a first direction, to open a higher voltage load circuit, or in a second direction, to close the load circuit. The transformer supplies the low voltage signal simultaneously to both coils to each relay. Two triacs are each connected to a different coil output from the relays. The triacs are normally in a non-conductive state which inhibits the low voltage signal from energizing both coils of each relay. The coil of each relay that is to be energized is selected by a momentary contact switch that provides a gating pulse to one of the triacs. The triac upon receipt of the gating pulse conducts and energizes the selected coil of each relay. The wiring system shown in this patent permits the utilization of and simultaneous opening and simultaneous closing of a substantial number of load circuits without introducing an undesirably high voltage drop despite the use of a substantial length of control wire of relatively small gauge. However, the number of load circuits controlled by the system is limited by the amount of current drawn by each relay and the amount of current supplied by the transformer.

One wiring system used to increase the number of relays and load circuits included an additional transformer connected in parallel with the standard transformer. The disadvantage of this system lies in its increased space requirements and cost.

It is a feature of this invention to increase the number of load circuits controlled by a remote control wiring system by having the system operate a first set of relays on a positive portion of a low voltage signal and a second set of relays on a negative portion of the low voltage relay signal.

Briefly, this feature of the invention may be provided by including a diode circuit in the low voltage sub-system of the remote control wiring system. The diode circuit comprises four diodes connected between two triac switches and two coil outputs from each set of a first set and a second set of relays. A first diode blocks the negative portion of a low voltage signal from energizing the first set of relays when a first triac conducts. A second diode blocks the negative portion of the low voltage signal from energizing the first set of relays when a second triac conducts. A third diode blocks a positive portion of the signal from energizing the second set of relays when the first triac conducts. A fourth diode blocks the positive portion of the signal from energizing the second set of relays when the second triac conducts. The conduction of one triac selects that coil of each relay in both sets of relays that is to be energized. When a coil is energized it is capable of operating a higher voltage load circuit in a predetermined direction, either for opening or for closing a relay.

The two triacs may be replaced by a momentary contact switch having two enable positions.

Also, the four diodes and two triacs may be replaced by four silicon controlled rectifiers. When the four rectifiers are arranged in a manner similar to the four diodes, firing of the first and third rectifiers or the second and fourth rectifiers may be controlled by a momentary contact switch.

Therefore in accordance with an aspect of this invention there is provided in a remote control wiring system for remotely controlling a plurality of high voltage load circuits having a lower voltage wiring sub-system, the sub-system comprising: a first set and a second set of lower voltage relays movable in a first direction and a second direction to respectively open and close the high voltage load circuits; switching means having an inhibit state in which the means precludes a low voltage signal having a positive and a negative portion from energizing the first set and the second set of relays, the switching means having a first enable state in which it permits the signal to energize the first set and the second set of relays to cause them to move in the first direction, and the switching means having second enable state in which it permits the signal to energize the first set and the second set of relays to move them in the second direction, and, a circuit operable with the switching means for precluding the negative portion of the signal from energizing the first set of relays and for precluding the positive portion of the signal from energizing the second set of relays, the circuit including a first and a second current blocking device each respectively blocking the negative portion of the signal from energizing the first set of relays when the switching means is respectively in its first and second enable states, and a third and a fourth current blocking device each blocking the positive portion of the signal from energizing the second set of relays when the switching means is respectively in its first and second enable states.

For a better understanding of the nature and objects of the invention, reference may be had by way of example, to the accompanying diagrammatic drawing.

Referring now to the sole drawing the preferred embodiment for the remote control wiring system of this invention is now described. A low voltage sub-system 10 is shown for controlling a higher voltage load circuit 12. Although only one loading circuit 12 is shown, it should be understand that for each relay 14 of the first set of relays 16 and the second set of relays 18 there is a corresponding load circuit 12. The first set of relays 16 and the second set of relays 18 are each shown to include four relays arranged in parallel. The number of relays of each set is limited by the amount of current drawn by each relay 14 of either set of relays 16 and 18 and the amount of current supplied by transformer 20. Each relay 14 is shown comprising a first solenoid coil 22 and a second solenoid coil 24 which define a central passageway in which solenoid plunger 26 of load circuit 12 moves axially therein. When coil 22 of each relay 14 is energized, plunger 26 moves in a first direction to close contacts 28 and 30 of load circuit 12. Where contacts 28 and 30 are closed, a higher voltage signal (about 125 volts) flows from aline L1 to line L2 through load 32 which is usually a lamp. When coil 24 of each relay 14 is energized solenoid plunger 26 moves in a second direction to open contacts 28 and 30. For a more detailed description of the relay used herein reference is made to Canadian Pat. No..689,194 issued June 23, 1964 to E. F. Reihman. Coils 22 and 24 share a common input line 34 along which a low voltage sinusoidal signal (about 25 volts) is supplied from transformer 20. The low voltage signal is developed on secondary 36 of transformer 20. The primary 38 of transformer 20 is connected to high voltage lines L1 and L2.

The selection of coils from either coils 22 or coils 24 that are to be energized is controlled by momentary contact switch 40, triac 42 and triac 44. Momentary contact switch 40 may be manually controlled or computer controlled. As shown, momentary contact switch 40 is in an inhibit state where neither triac 42 nor triac 44 is conducting. In this state coils 22 and coils 24 of relays 14 cannot be energized. A first enable state occurs when switch 40 contacts terminal 46. In this state gate 48 of triac 42 is supplied positive voltage from supply 78 through current limiting resistor 50. This results in a gating pulse at gate 48 causing triac 42 to conduct. The conduction of triac 42 allows the low voltage signal from transformer 20 to energize coils 22 of the first set of relays 16 and the second set of relays 18. During the conduction of triac 42 diode circuit 58 only permits a positive portion of the low voltage signal to energize coils 22 of the first set of relays 16 and a negative portion of the signal to energize coils 22 of the second set of relays 18. Similarly, a second enable state occurs when switch 40 contacts terminal 52. In this state gate 54 of triac 44 is supplied positive voltage from supply 78 through current limiting resistor 56. This results in a gating pulse at gate 54 causing triac 44 to conduct. The conduction of triac 44 permits the low voltage signal from transformer 20 to energize coils 24 of the first set of relays 16 and the second set of relays 18. During the conduction of triac 44 diode circuit 58 only permits the positive portion of the low voltage signal to energize coils 24 of the first set of relays 16 and the negative portion of the signal to energize coils 24 of the second set of relays 18.

The arrangement of diode circuit 58 comprising diodes 60, 62, 64 and 66 is now described. Diode 60 has its anode connected to output line 66 of coils 22 for the first relay set 16 and its cathode joined to terminal 68 of triac 42. Diode 62 has its anode connected to output line 70 of coils 24 for the first relay set 16 and its cathode joined to terminal 72 of triac 44. Diode 64 has its cathode connected to output line 74 of coils 22 for the second relay set 18 and its anode joined to terminal 68 of triac 42. Diode 66 has its cathode connected to output line 76 of coils 24 for the second relay set 18 and its anode joined to terminal 72 of triac 44.

The operation of the diode circuit 58 is now explained for the event where triac 42 is conducting and the positive portion of the low voltage signal is present. In this event the positive portion of the signal results in diode 60 conducting and coils 22 of set 16 being energized. It should be understood that an alternate path for the positive signal portion is blocked by diode 64. The alternate path is through coils 24 of set 16, diode 62, diode 66 and coils 22 and 24 of set 18. Diode 64 does not conduct because the potential at its cathode is positive and the potential at its anode is ground. Similarly, for each of the remaining three conducting states or events one diode or diodes 60, 62 and 64 acts to block an alternate path.

This arrangement of the diode circuit is significant because it allows two sets of relays to be operated from one low voltage signal. The significance of this arrangement can be better appreciated when compared with another diode circuit arrangement. The other diode circuit arrangement includes two diodes where a first diode is located between the transformer secondary and an input line leading to the shared input lines of the first set of relays. The second diode is located between the transformer secondary and an input line leading to the shared input lines of the second set of relays. The diodes are arranged having opposite polarities. The problem with this proposed two diode arrangement is that when first coils of one of the relay sets are energized shunt paths are provided through second coils of the same relay set and the two coils of the other relay set. As these shunt connected coils operate adversely to the energized first coils, the reliability of their operation is jeopardized. Also a bridge diode circuit arrangement does not permit both coils of each set of relays to be controlled therefrom.

What I claim as new and desire to secure by Letters Patent of the United States is:

1. In a remote control wiring system for remotely controlling a plurality of high voltage load circuits having a lower voltage wiring sub-system, said sub-system comprising:
    a first set and a second set of low voltage relays movable in a first and a second direction to respectively open and close the high voltage loading circuits;
    switching means having an inhibit state in which said means precludes a low voltage signal having a positive and a negative portion from energizing said first set and said second set of relays, said means having a first enable state in which it permits said signal to energize said first set and said second set of relays to cause them to move in said first direction, and said means having a second enable state in which it permits said signal to energize said first set and said second set of relays to move them in said second direction; and,
    a circuit operable with said switching means for precluding the negative portion of said signal from energizing said first set of relays and for precluding the positive portion of said signal from energizing said second set of relays; said circuit including a first and a second current blocking device each respectively blocking the negative portion of the signal from energizing said first set of relays when said switching means is respectively its first and second enable states, and a third and a fourth current blocking device each respectively blocking the positive portion of said signal from energizing said second set of relays when said switching means is respectively in its first and second enable states.

2. The remote control wiring system of claim 1 wherein said current blocking devices each comprises a diode.

3. The remote control wiring system of claim 1 wherein said switch means comprises a momentary contact switch and said first, second, third and fourth current blocking devices respectively comprise first, second, third and fourth silicone controlled rectifiers, said momentary contact switch in the first enable state firing the first and third silicon controlled rectifiers and in the second enable state firing the second and fourth silicon controlled rectifiers.

4. The remote control wiring system of claim 2 wherein said switching means includes a first and a second triac, said first triac being connected to said first and said third current blocking devices and conducting upon receiving a first gating pulse from said switching means when said means is in its first enable state, and said second triac being connected to said second and said fourth blocking devices and conducting upon receiving a second gating pulse from said switching means when it is in said second enable state.

5. The remote control wiring system of claim 4 wherein said switching means further includes a momentary contact switch.

6. The remote control wiring system of claim 4 wherein said switching means further includes a computer.

7. The remote control wiring system of claim 2 wherein each relay of said first set and said second set of relays comprises a first solenoid coil and a second solenoid coil defining a central passageway in which a solenoid plunger is movable in the first and the second directions.

8. The remote control wiring system of claim 7 including a transformer connected to the lower voltage wiring sub-system supplying said low voltage signal thereto.

* * * * *